USOO6146104A

United States Patent [19]
Mastroianni et al.

[11] Patent Number: 6,146,104
[45] Date of Patent: Nov. 14, 2000

[54] GROUNDWATER RECOVERY SYSTEM INCORPORATING A COMBINATION OF PRESSURE AND VACUUM TO ACCOMPLISH REMOVAL OF GROUNDWATER FLUIDS FROM A DOWNHOLE PUMP

[75] Inventors: John J. Mastroianni; Darren M. DeFabo, both of Houston, Tex.

[73] Assignee: The IT Group, Inc., Monroeville, Pa.

[21] Appl. No.: 08/966,300

[22] Filed: Nov. 7, 1997

Related U.S. Application Data

[60] Provisional application No. 60/030,073, Nov. 8, 1996.

[51] Int. Cl.⁷ .............................. F04F 1/06; F04F 19/24; E21B 43/00
[52] U.S. Cl. .......................... 417/54; 417/131; 417/134; 417/53; 166/370; 166/372
[58] Field of Search .............................. 417/54, 131, 133, 417/134, 53; 166/267, 370, 372

[56] References Cited

U.S. PATENT DOCUMENTS

| | | | |
|---|---|---|---|
| 4,181,470 | 1/1980 | Gillett | 417/131 |
| 4,243,529 | 1/1981 | Strauss | 210/109 |
| 4,248,305 | 2/1981 | Scarbrough et al. | 166/305.1 |
| 4,273,650 | 6/1981 | Solomon | 210/104 |
| 4,307,525 | 12/1981 | Maloblocki | 37/65 |
| 4,323,122 | 4/1982 | Knopik | 166/267 |
| 4,431,534 | 2/1984 | Gordon | 210/110 |
| 4,469,170 | 9/1984 | Farmer, Jr. | 166/53 |
| 4,497,370 | 2/1985 | Breslin | 166/372 |
| 4,527,633 | 7/1985 | McLaughlin et al. | 166/370 |
| 4,625,807 | 12/1986 | Harlow | 166/370 |
| 4,660,639 | 4/1987 | Visser et al. | 588/228 |
| 4,663,037 | 5/1987 | Breslin | 210/170 |
| 4,761,225 | 8/1988 | Breslin | 210/104 |
| 5,004,405 | 4/1991 | Breslin | 417/131 |
| 5,013,218 | 5/1991 | Spencer | 417/37 |
| 5,076,360 | 12/1991 | Morrow | 166/267 |
| 5,172,764 | 12/1992 | Hajali et al. | 166/267 |
| 5,190,108 | 3/1993 | Mansuy | 166/371 |
| 5,271,467 | 12/1993 | Lynch | 166/370 |
| 5,358,357 | 10/1994 | Mancini et al. | 405/128 |
| 5,373,897 | 12/1994 | Skarvan | 166/53 |
| 5,451,144 | 9/1995 | French | 417/131 |
| 5,452,765 | 9/1995 | Blanchard et al. | 166/370 |
| 5,464,309 | 11/1995 | Mancini et al. | 405/258 |
| 5,622,450 | 4/1997 | Grant, Jr. | 405/128 |
| 5,839,513 | 11/1998 | Czirr | 166/370 |

*Primary Examiner*—Charles G. Freay
*Assistant Examiner*—Robert Z. Evora
*Attorney, Agent, or Firm*—Luedeka, Neely & Graham, P.C.

[57] ABSTRACT

A well and method for using the well for removing lighter than water pollutants (e.g. hydrocarbons and other organics) from a water table. The well includes a pneumatic pump having an air exhaust port to which a vacuum hose is attached for applying a vacuum to the pump chamber to enable fluids to be drawn into the pump chamber without regard to the hydrostatic head and at a rate sufficient to provide a drawdown of the water table to enable capture of organic compounds present as a floating layer on the water table.

15 Claims, 5 Drawing Sheets

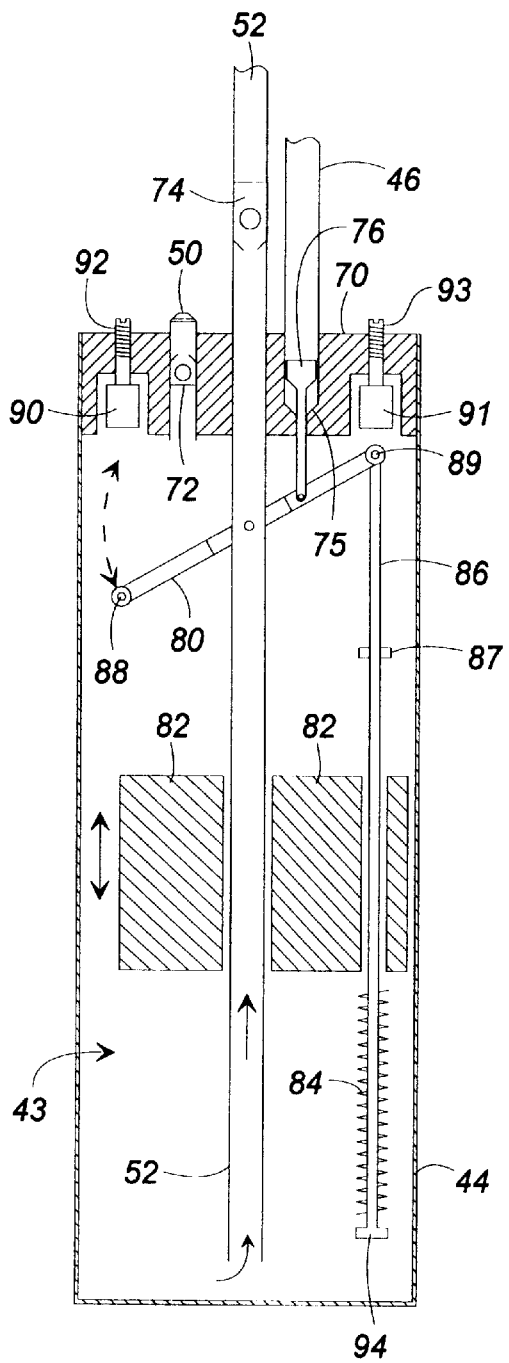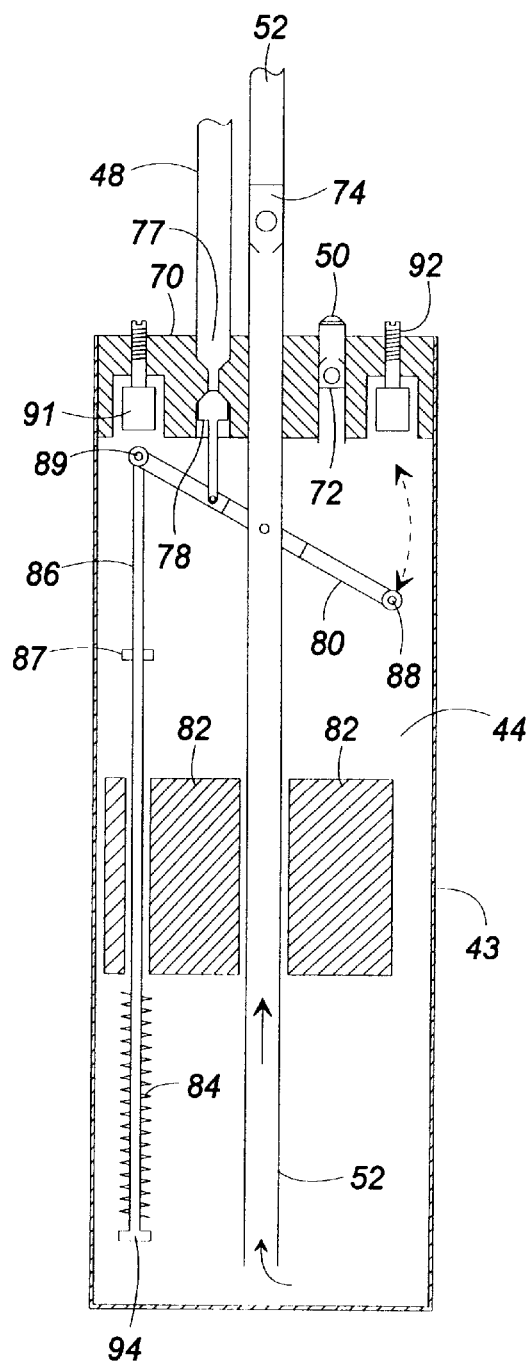
*FIG. 4a*  *FIG. 4b*

GROUNDWATER RECOVERY SYSTEM INCORPORATING A COMBINATION OF PRESSURE AND VACUUM TO ACCOMPLISH REMOVAL OF GROUNDWATER FLUIDS FROM A DOWNHOLE PUMP

This application claims the benefit under 35 U.S.C. §119(e)(1) of the filing date of provisional application Ser. No. 60/030,073 filed Nov. 8, 1996.

FIELD OF THE INVENTION

This invention relates generally to treatment of aquifers contaminated with organic materials. More particularly, the invention relates to a pneumatic pumping system for removing groundwater and organic contaminants from a subterranean formation at an increased rate with improved control as compared to conventional pneumatic systems.

BACKGROUND OF THE INVENTION

Aquifers are generally characterized within a subterranean formation as a water table at some level below the ground surface with a capillary fringe region of varying depth overlying the water table. A vadose zone or unsaturated area typically extends between the capillary fringe and the ground surface.

Aquifers which have become contaminated such as by the presence of gasoline and other organic contaminants floating on the water table are often remediated by removing the groundwater from the aquifer and stripping contaminants from the groundwater which is then returned to the aquifer substantially free of contaminants. The use of downhole pneumatic pumps to accomplish removal of groundwater and contaminants is desirable since pneumatic pumps are generally less expensive, easier to operate and maintain and they eliminate the use of electricity and the sparking hazards associated therewith. However, conventional downhole pneumatic pumps have several disadvantages which limit their usefulness in many applications. For example, the fill rate of the pump is limited by the pressure or head of the liquid at the pump intake. To provide an acceptable fill rate, it is generally necessary to submerge the intake to a depth considerably below the liquid level in the casing and this limits the rate of floating hydrocarbon which is drawn in with the water. Also, as the liquid level fluctuates due to various influences, the position of the intake must be constantly adjusted.

Accordingly it is an object of the invention to provide an improved system for recovering groundwater.

Another object of the invention is to provide an pneumatic system for removing groundwater contaminated with hydrocarbons from a subterranean aquifer.

Still another object of the invention is to provide a pneumatic pump system which enables manipulation of the fill rate of the pump chamber independent of the depth of the pump intake below the water table.

An additional object of the invention is to provide a system of the character described which enables the removal of groundwater and organic contaminants from a subterranean formation at an increased rate as compared with conventional pneumatic systems.

Yet another object of the invention is to provide a system of the character described which enables the pump chamber of a pneumatic pump to be filled at a rate sufficient to maintain a drawdown of the water level to the pump intake to enable capture of floating contaminants.

Yet another object of the present invention is to provide a system of the character described which overcomes disadvantages of prior art pneumatic extraction systems.

Still another object of the invention is to provide a system of the character described which is uncomplicated in configuration and economical to operate.

SUMMARY OF THE INVENTION

With regard to the foregoing and other objects, the present invention is directed to apparatus for removing fluids from a subterranean formation having an aquifer including a water table spaced below the ground surface and contaminated by the presence of organic compounds in fluids therein.

According to one embodiment of the invention, the apparatus includes a well casing extending downwardly from the ground surface to a location below the water table, the well casing including perforations which are permeable to fluids present in the formation and being positioned so that liquids from the water table may enter the casing by means of flow into the casing through the perforations to establish a liquid level within the casing. The well casing is sealed to limit ingress of ambient air from above the ground surface into the casing.

A pneumatic pump provided within the well casing includes a pump chamber and an inlet for flow of liquid into the chamber from the casing. A first conduit is connected in flow communication between the pump chamber and a vacuum source for evacuating air from the pump chamber. A second conduit is connected in flow communication between the casing and the vacuum source for applying a vacuum to the annular area to evacuate fluids therefrom. A third conduit is connected in flow communication between the pump chamber and a source of pressurized air for delivering pressurized air into the pump chamber.

The application of a vacuum to the pump chamber in conjunction with vacuum applied to the casing is a particularly advantageous feature of the invention which enables the pump chamber to be filled rapidly despite a relatively low hydrostatic head at the intake and to provide a drawdown of the water table to adjacent the intake to enable capture of organic compounds present as a floating layer on the water table at a higher rate without having to readjust the position of the intake.

Another aspect of the invention relates to a method for removing fluids from a subterranean formation. In accordance with one embodiment, the method includes a well structure as set forth above using a pneumatic pump including structure for applying a vacuum to the pump chamber, applying a vacuum to the pump chamber to induce a flow of formation fluids from within the casing into the pump chamber at a rate sufficient to provide a drawdown of the water table within the casing from the initial level to a second level which is closely adjacent the intake port to introduce a flow of fluids from the formation into the pump chamber and enable capture of organic compounds present as a floating layer on the water table, and applying a flow of pressurized air to the pump chamber to displace fluids introduced into the pump chamber from the formation.

BRIEF DESCRIPTION OF THE DRAWINGS

The above and other features and advantages of the present invention will become further known from the following detailed description when considered in conjunction with the accompanying drawings in which:

FIGS. 4a and 4b are sectioned views of the pump showing air and fluid conduits, float actuator, check valves, and pivot arm of the pneumatic valve and air inlet poppet.

DETAILED DESCRIPTION

Figure 1:
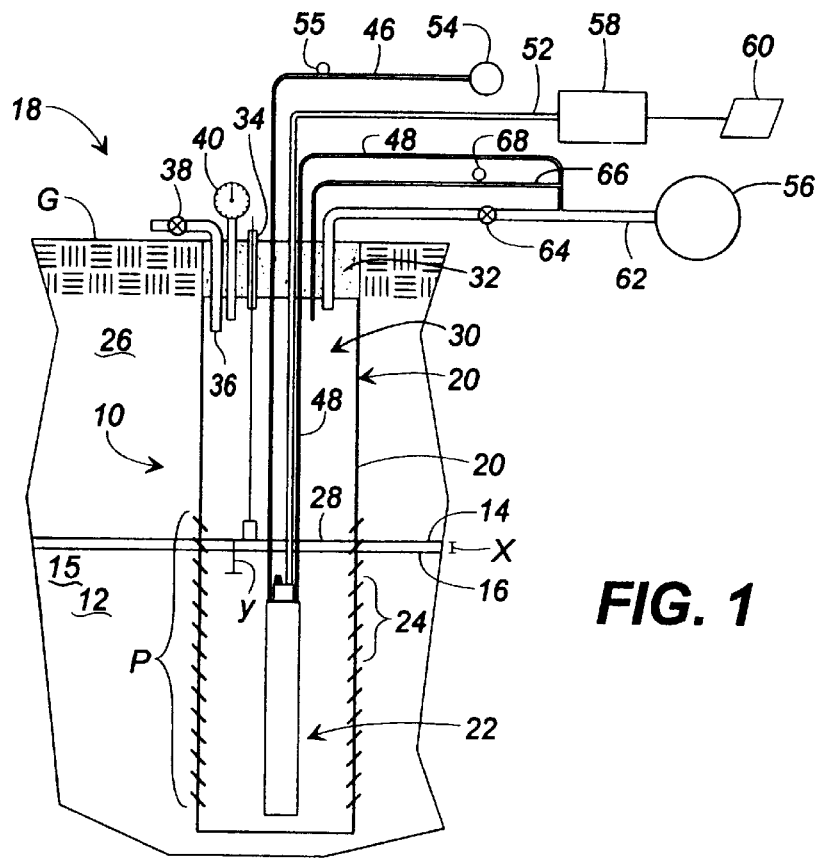
FIG. 1 is a diagrammatic view illustrating various features of one embodiment of the present invention of a system for removing liquids from a subterranean formation and FIG. 1a is an enlargement of the upper end of the pump chamber shown in FIG. 1.

Referring now in more detail to the drawings in which like numerals refer to like parts throughout the several views, and with initial reference to FIGS. 1 and 3, there is shown diagrammatically one condition of a contaminated subterranean formation generally indicated at 10 including an aquifer 12 having a water table 14 below the ground surface G defining the upper extent of a saturated zone 15 residing a distance Y below the surface G. A layer 16 of organic contaminants, e.g., hydrocarbons, is located adjacent the uppermost portion of the saturated zone 15 near or on top of the water table 14.

As will be appreciated, the layer 16 of organic contaminants, being generally partially or completely immiscible with water and less dense than water, may have a thickness X of from a few inches to several feet. The concentration of organics may gradually decrease with depth such that the highest concentration of organics is present adjacent the water table 14. As will be appreciated, the formation shown in FIG. 1 is only one example of the condition or structure of a formation for which the invention may find application, it being understood that formations and the contamination profile may vary widely from site to site within the scope of the invention.

As used herein, the term "aquifer" refers generally to a water bearing stratum of permeable rock, sand or gravel or mixtures thereof and the term "water table" generally refers to the top level of the water-saturated zone, it being understood that the water table may naturally experience gradual changes or fluctuations due to seasonal influences, extraction of groundwater and the like.

It is understood that the aquifer may be contaminated by the presence of organic compounds distributed therein among the various portions of the aquifer. Thus, the organic contaminants may be present as the floating layer 16 on the water table 14 and it will be understood that reference to the position of the intake of a pneumatic pump for removal of liquids from the aquifer includes positioning the intake of the pump adjacent liquid organic contaminants on, in or above the water in the formation to effect removal of the same. For example, where organic contaminants are present as a floating layer on the water table, it is preferred to position the intake of the pump in or just below the film during steady-state operation of the system; e.g., once any drawdown of the water table is accomplished. Also, organic contaminants may be present in liquid or gas form in the capillary fringe or the vadose zone and it is contemplated that removal of contaminant in these areas in liquid and gas form may be accomplished using the present invention and that the removal of such contaminants may include the removal of a significant amount of groundwater and formation gases.

Exemplary organic contaminants which may be removed using the invention include gasoline, diesel fuel and other petroleum-derived compounds as well as a wide range of saturated and unsaturated hydrocarbons, substituted and unsubstituted, with various halogens; e.g., carbon tetrachloride, benzene and toluene, to name a few; and any other liquid contaminant which may be removed using a downhole pneumatic pump.

Figure 1A:
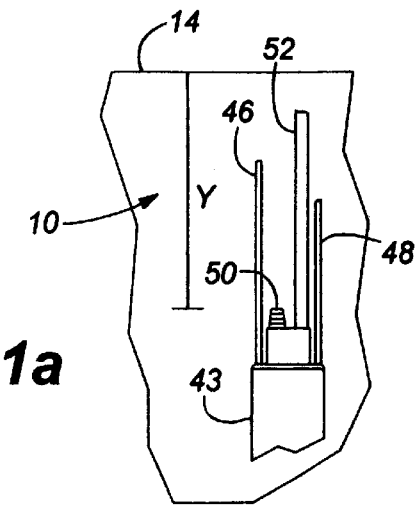

Referring now to FIG. 1 in conjunction with to FIGS. 1(a) and 2, liquids, primarily groundwater and organic contaminants adjacent the water table, are extracted from the formation using a well 18 having a well casing 20 in a borehole extending downwardly from the ground surface G to a location below the water table 14 and a pneumatic pump system 22.

The well casing 20 preferably includes a plurality of perforations 24 provided therethrough which are preferably permeable to both liquids and gases present in the formation 10. In a preferred embodiment, the casing 20 is positioned so that the perforations 24 provide a zone P of continuous permeability which bridges between the portion of the formation 10 containing the water table 14 and vadose or "unsaturated" zone 26 which often contains contaminant gases or vapors. Thus, liquids as well as gases may pass into the casing 20 through the perforations 24 to establish a liquid level 28 within the casing 20 which initially corresponds to the natural level of the water table 14 in the formation, wherein the head space 30 within the casing above the liquid level 28 is occupied by gas, including gas from the formation. The construction aspects of perforated well casings usable in the practice of the invention are well known to those of ordinary skill and are described in various publications including, for example, the publication entitled "Proceedings of the NWWA/API Conference on Petroleum Hydrocarbons and Organic Chemicals in Ground Water-Prevention, Detection and Restoration" (1984) and published by National Well Water Association, 637 Riverside Drive, Dublin, Ohio 43017, the disclosure of which is incorporated herein by reference.

A seal, such as a concrete seal 32, is preferably provided at the top of the well casing 20 to limit entry of liquids and gases from the atmosphere into the headspace 30 through the top of the casing. A seal is especially important in those embodiments of the invention which employ a vacuum within the casing 20 to enhance the rate of fluid movement toward the well from the surrounding formation.

A liquid level indicator 34 preferably extends through the seal 32 for measurement of the liquid level in the head space 30. In addition, a vent conduit 36 may extend through the seal 32 in flow communication with the head space 30 to releaseably seal the annular area from flow communication with the atmosphere above the ground surface or to adjust the degree of sealing for limited ingress of air. The vent conduit 36 may also include a vacuum relief valve 38 which may be manually or automatically opened to provide a flow of gas from the atmosphere into the head space 30 to normalize the annular area to a preselected pressure; e.g., atmospheric, if desired. In a preferred embodiment, the pressure in the head space 30 is maintained substantially below atmospheric pressure. The pressure in the head space 30 may be monitored as by use of a pressure gauge 40 extending through the seal to the annular area.

The pump system 22 comprises a downhole pneumatic pump 42 which includes an elongate, generally cylindrical pump chamber 44 in selective flow communication with an air inlet conduit 46, and air exhaust conduit 48, a fluid inlet 50, and a fluid discharge conduit 52, all positioned in the illustrated embodiment adjacent the uppermost end of the pump above the pump chamber. In a preferred embodiment, the pneumatic pump 42 is a modified form of a controllerless downhole pneumatic pump known as a "Standard AP-4/TL" (standard top-loading 4-inch) pneumatic pump available under the tradename AUTOPUMP from Clean Environment Equipment of Oakland, Calif. However, it will be understood that the invention is applicable to virtually any type or configuration of downhole pneumatic pump.

The AUTOPUMP series of pumps available from Clean Environment Equipment are "controllerless" in that such pumps continue to fill and empty as long there is fluid in the well sufficient to fill the pump and compressed air of sufficient pressure to overcome the hydrostatic head against which the pump is passing fluid. This "controllerless" system and its operation are described in U.S. Pat. No. 5,004,405, incorporated herein by reference in its entirety.

The air inlet conduit 46, air exhaust conduit 48, and fluid discharge conduit 52 preferably extend upwardly through the concrete seal 30 as shown in FIG. 1. The basic operation of the pump 42 involves application of a vaccum to the pump chamber 44 via the air exhaust conduit 48, which increases the pressure differential between the chamber and liquid in the casing covering fluid inlet 50 so that liquid more readily flows into and fills into the pump chamber. A flow of compressed fluid such as air is directed into the pump chamber 44 through an inlet conduit 46 to force fluid collected in the pump chamber to the surface via the fluid discharge conduit 52.

A mechanical sensor within the pump chamber 44 senses that the pump chamber 44 is filled to a desired level and a valve positioned between the pump chamber 44 and the air exhaust conduit 48 blocks application of the vacuum to the pump chamber 44. Simultaneously therewith, the air inlet conduit 46 and the fluid discharge conduit 52 are placed in flow communication with the pump chamber 44 and compressed air introduced into the pump chamber 44 via the air inlet conduit 46 forces the collected fluid from the pump chamber 44 via the fluid discharge conduit 52. This cycle is then repeated as desired to accomplish the desired removal of fluids from the formation.

Accordingly, in a preferred embodiment, air inlet conduit 46 provides fluid flow communication between pump chamber 44 and a controllable source of compressed air 54 for delivery of compressed air to the chamber sufficient to enable emptying of a pump chamber in a few seconds. A gauge 55 may be provided on the conduit 46 for monitoring the pressure within the conduit. The air exhaust conduit 48 provides flow communication between a source 56 of negative pressure, such as a vacuum pump, and pump chamber 44 to significantly increase the fill rate of the pump.

The fluid discharge conduit 52 provides flow communication between the chamber 44 and a holding tank 58 for collection of formation fluids. Fluids collected in tank 58 may be treated as at 60 by conventional methods and apparatus to remove the offending compounds, preferably enabling return of the groundwater to the aquifer in accordance with applicable EPA regulations.

To enable application of a negative or subatmospheric pressure to the well head space 30, a conduit 62 also preferably extends through the seal 32 providing flow communication between the space 30 and the vacuum source 56. In a preferred embodiment, a valve 64 is provided in the conduit 62 downstream of the juncture of the conduits 62 and 48 to enable manipulation of the negative pressure applied to the space 30 in relation to that applied to pump chamber 44. In the fill mode, the negative pressure applied to the pump chamber 44 exceeds that applied to the space 30 to promote an increased rate of liquid intake into pump chamber 44 through opening 50, as will be explained more fully below. Accordingly, a conduit 66 having a differential pressure gauge 68 and in flow communication with the head space 30 and the conduit 48 may be provided to monitor the pressure differential between the conduit 48 (and hence the pump chamber) and the head space 30. FIG. 1 and FIG. 3 are identical, except that the gauges 40 and 68 are in series and enter the seal 32 through an access port 69 which also accommodates the liquid level indicator 34.

The pump system is preferably installed in the well such that the fluid intake 50 of pump 22 is a distance Y of from about 1 to about 10 feet below the initial or static water table 14 when the well is first installed. Vacuum is then applied to pump chamber 44 in the "fill mode" to draw liquid from the casing into the pump chamber 44 through inlet opening 50. In the "pump discharge mode" pressurized air is admitted into chamber 44 via the conduit 46 to induce a flow of liquid from chamber 44 through conduit 52 into tank 58.

With reference to FIGS. 4a and 4b, the pump includes a cap 70 through which the conduits 46, 48, 52 and intake 50 extend to render them in flow communication with the pump chamber 44. A check valve 72 positioned in the intake 50 inhibits fluids from leaving the chamber 44 through the intake 50 when compressed air is supplied to the pump chamber 44 to discharge fluid from the chamber via the conduit 52. A check valve 74 positioned in-line in the conduit 52 inhibits fluid from draining back into the pump chamber 44. Compressed air may be introduced into the pump chamber 44 via the conduit 46 and port 75 and the associated inlet poppet valve 76 is provided to block the passage of compressed air into the chamber during the filling cycle. Vacuum may be applied to the pump chamber 44 via the conduit 48 and port exhaust port 77 and the associated outlet poppet valve 78 is provided to block the port 77 during the discharge cycle.

The pump further includes a pivot arm 80 to which the poppet valves 76 and 78 are connected, a float 82, a spring 84, and a control rod 86 having a stop 87. Steel roller pins 88 and 89 are provided at the respective ends of the pivot arm 80, with the rod 86 secured to the pivot arm 80 adjacent roller 89, and magnets 90 and 91 are provided at the lower end of the 70 operatively associated with adjustment screws 92 and 93 for vertical adjustment of the position of the magnets 90 and 91.

During the filling stage, vacuum is applied to the pump chamber 44 via the conduit 48 to draw fluids into the chamber via the inlet 50. The float 82 is initially adjacent the lower end of the pump chamber when the chamber is empty, such that the spring 84 is compressed and the end of the pivot arm 80 on which the roller 88 is provided is raised above the other end and is adjacent the magnet 90. This position of the pivot arm 80 maintains the poppet valve 76 in a closed relationship to prevent compressed air from entering the chamber 44 and maintains the poppet valve 78 in an open relationship to permit a vacuum to be applied to the chamber 44.

The entering fluid rises in the pump chamber 44 forcing the float 82 upwards towards the rod stop 87. When the float reaches the stop 87 it pushes up on the control rod 86 and thus up on the roller 89. As the float submerges, the upward force increases on the roller 89 until it overcomes the magnetic attraction between the roller 88 and the magnet 90, at which point the pivot arm swings to render the roller adjacent the magnet 91. This causes the valve 76 to open and the valve 78 to close. Opening of the valve 76 opens the port 75 and enables compressed air to enter the chamber 44 and thereby discharge fluid from the chamber 44 via the conduit 52. In addition, the pressure from the compressed air forces the valve 72 to close preventing air and liquid from exiting the chamber 44 via the inlet 50. Closing the valve 78 closes the port 77 and ceases the application of vacuum to the pump chamber 44.

As the fluid leaves the chamber 44, the float 82 lowers and compresses the spring 84 against stop 94 on the end of the control rod 86. When sufficient force is reached to dislodge the steel roller 89 from the magnet 91, the pivot arm 80 swings through an arc to position the roller 88 adjacent the magnet 90 and open the valve 78 and close valve 76. This cycling automatically continues until fluid fails to fill the pump 42 or the pressure of the compressed air is insufficient to move the fluid.

Figure 2:
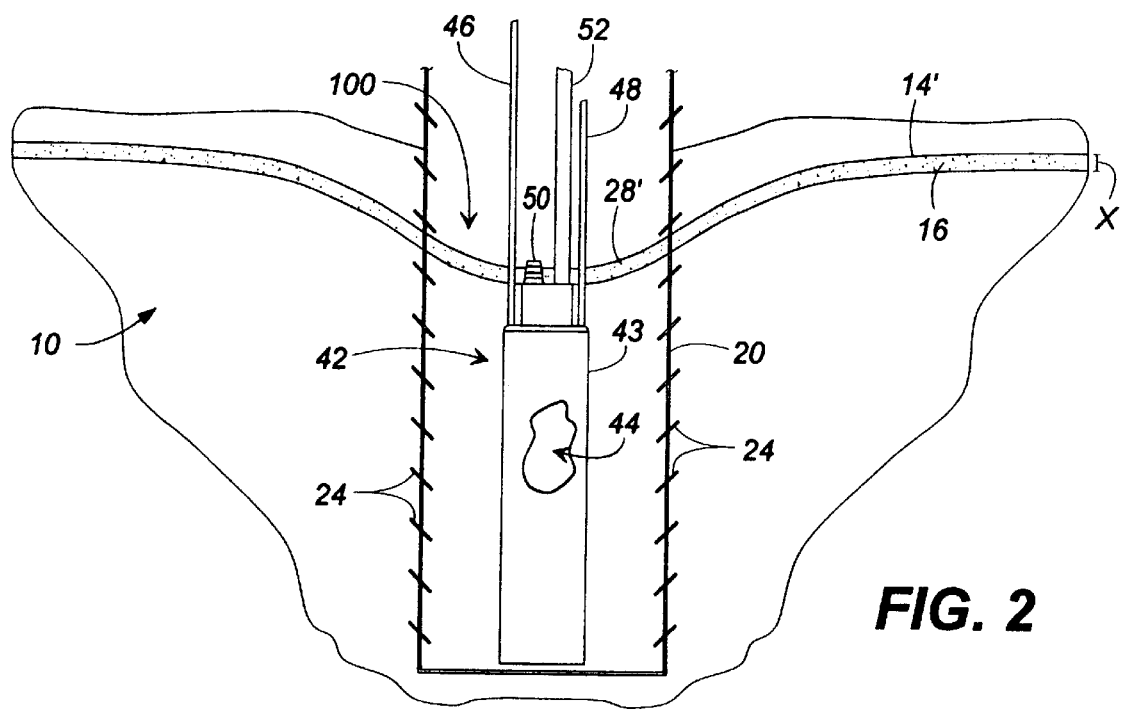
FIG. 2 is a detailed diagrammatic view showing the system of FIG. 1 during operation wherein the water level is maintained substantially adjacent the intake of the pneumatic pump so that the fluid entering the pump chamber contains a relatively large amount of organic contaminants.

With reference to FIG. 2, it will be understood that after the first or first few pump cycles the water level within the annular area, as indicated by reference numeral 28', may be decreased from its initial level 28, thus providing a so-called "cone-of depression" 100 extending into the formation outside of the casing. As will be appreciated, the ratio of hydrocarbons removed to water removed (as well as other contaminants) may be increased by lowering and maintaining the water level 28' to a position adjacent to the pump intake 50 as shown in FIG. 2. This may be accomplished in the case of a sealed or an unsealed well by manipulating the flow rate of liquid into the pump 42 to provide the desired level 28'. The level 28' in such a case may be maintained at a desired level, for example, by monitoring the water level in the well and adjusting the vacuum applied to the pump chamber 44 accordingly.

In a preferred embodiment in which a sealed well such as shown in FIG. 1 is used, the water level 28' may be maintained at a desired level by manipulating the pressure differential between the pump chamber 44 and the well head space 30 within a desired range. For example, applying a vacuum to space 30 within the casing 20 will tend to increase the flow of formation fluids toward the casing 20 thus tending to increase the liquid level therein. However, applying a vacuum to the pump chamber 44 will increase the rate at which liquid is drawn into the pump chamber 44 from the casing 20. By manipulating the vacuum applied to the space 30 relative to that applied to the pump chamber 44, groundwater and liquid contaminants may be advanced to the casing from the surrounding formation at a faster rate and removed from the casing at a faster rate as compared to conventional pneumatic extraction systems with the added advantage of withdrawal of contaminant vapors from the vadose zone, for an overall synergistic effect.

The desired differential pressure for a particular well and lithology is preferably determined by monitoring the differential pressure using the gauge 68 during steady state operation of the well and adjusting the valve 64 to adjust the differential pressure until the desired water level 28' or draw down is observed, to be maintained in and around the casing.

Figure 3:
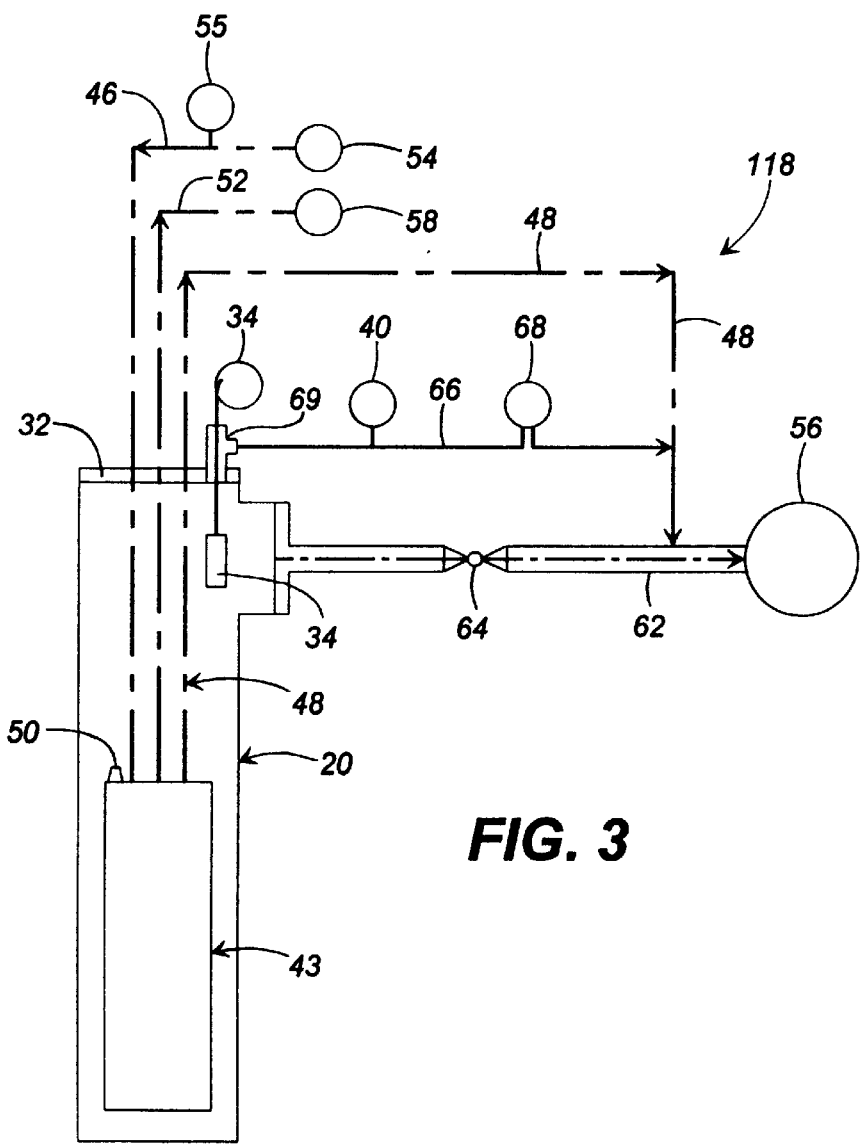
FIG. 3 is a schematic diagram of the well of FIG. 1.
Figure 5:
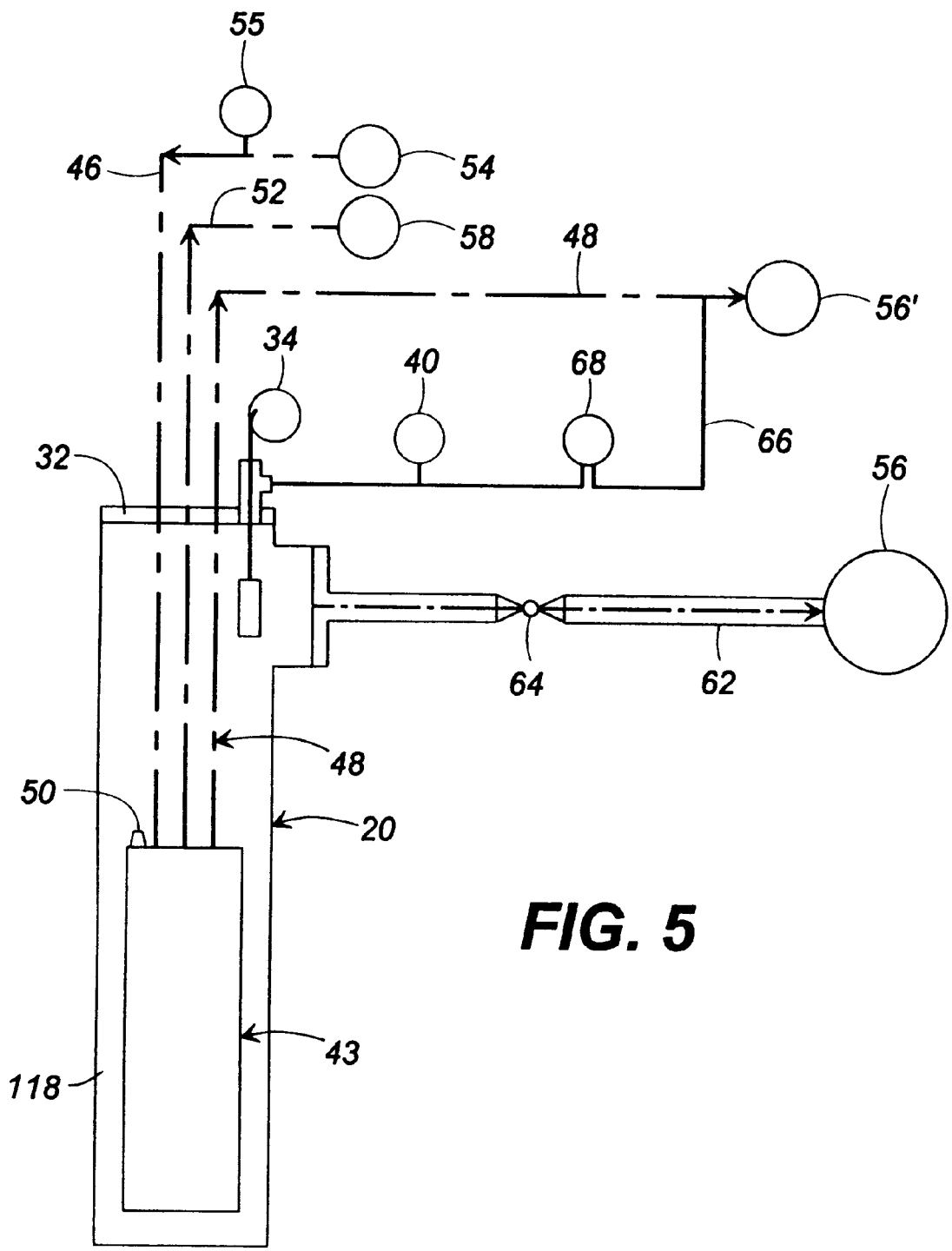
FIG. 5 is a schematic diagram of an alternate embodiment which uses separate vacuum pumps, one in flow communication with the cased area of the well and one in flow communication with the pump chamber.

FIG. 5 shows an alternate embodiment of the invention which is a well 118 basically identical to the well of FIG. 3, except that the conduit 48 is in flow communication with a source of negative pressure 56' instead of the same source 56 as the casing.

Figure 6:
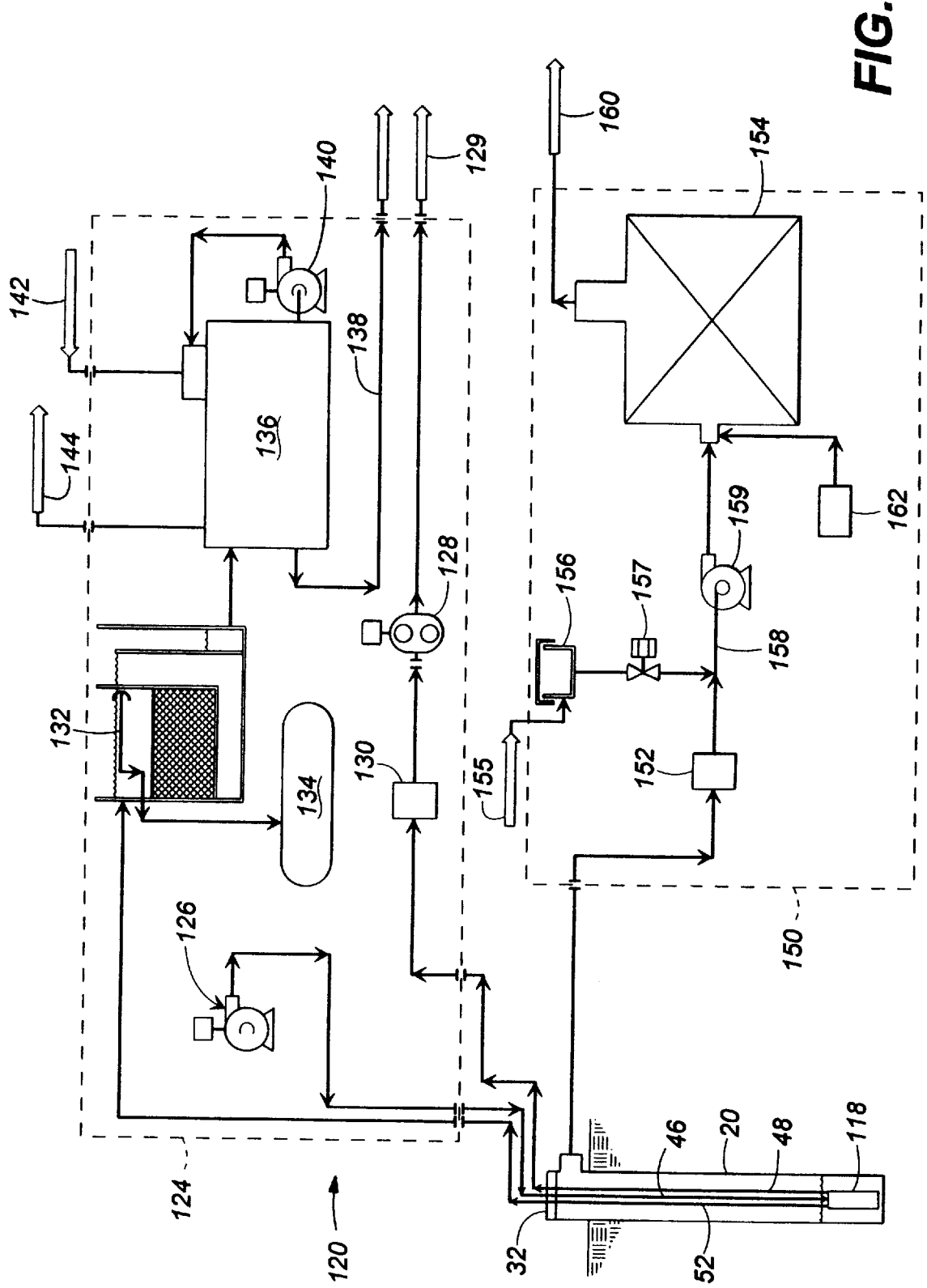
FIG. 6 is a schematic diagram of the well of FIG. 5 and above-ground support systems.

FIG. 6 is a schematic diagram of a system 120 including the well 118 of FIG. 5 and above-ground support systems. The system 120 includes a system 124 having an air compressor 126 for introducing compressed air into the pump chamber, and a vacuum blower 128 vented to the atmosphere via vent 129 and vapor/liquid separator 130 for applying a vacuum to the pump chamber.

The system 124 also includes equipment for treating recovered formation fluids, such as an oil/water separator 132 in flow communication with the discharge conduit 52, a holding tank 134, and a air/liquid jet stripper 136. The stripper 136 preferably includes a conduit 138 for discharging sewerable liquids, and a pump 140 for recirculating fluids. The stripper 136 also includes inlet vent 142 and outlet vent 144, both in flow communication with the atmosphere.

A system 150 is provided for applying a vacuum to the well casing. The system 150 preferably includes a vapor/liquid separator 152 in flow communication with the well casing and a thermal oxidation unit 154 for volatilizing organic vapors drawn from the well casing area. A vent conduit 155 having a filter 156 and valve 157 are provided for introducing air into conduit 158 which extends between the separator 152 and the oxidation unit 154. A pump 159 is preferably provided along conduit 158. The unit 154 preferably includes a vent 160 and a source of heat, such as propane tank 162 in flow communication with a burner located within the unit.

The following nonlimiting examples demonstrate various aspects of the invention.

EXAMPLE 1

An experimental well having four-inch diameter casing to a depth of 22.0 feet was provided. A standard AP-4/TL pump was positioned in the bottom of the well. Casing was set to the total depth of the well and extended to above grade. A 4-inch PVC tee joint was attached to the extended well casing and a vacuum pump available under Model No. 412 DVJ from Roots was attached to a side of the tee using 2-inch i.d. PVC piping. A well seal available under Model No. 111 from Simmons was placed on top of the tee. Hoses from a source of compressed air and a fluid discharge hose connected to the pump were passed through the seal. The well depth of 22.0 feet and a water depth of 16.95 feet were measured from the top of the tee. The distance from the bottom of the pump to the intake to the pump chamber was measured at 52 inches. Operation of the well under various conditions yielded the results of Table 1.

EXAMPLE 2

The well of Example 1 was modified by installing a globe valve in the 2-inch vacuum line and by installing a hose between the air exhaust port of the pump (through the well seal) to the high vacuum side of the 2-inch line. A differential pressure gauge and associated piping was installed to measure the differential pressure between the annular area and the air exhaust port of the pump. The depth of water in the was observed to be 17.00 feet as measured from the top of the tee prior to placement of the pump in the well. Operation of the well under various conditions yielded the results of Table 2.

TABLE 1

| DEPTH APPLIED TO WATER (ft) | VACUUM APPLIED TO CASING (in Hg) | APPLIED HEAD (ft $H_2O$) | TOTAL HEAD (ft $H_2O$) | TIME (min.) | FLOW RATE (gpm) | YIELD (gpm/ft) | AIR PRES. (psig) |
|---|---|---|---|---|---|---|---|
| 17.67 | 0.0 | 0.0 | 0.7 | 44.0 | 0.3 | 0.424 | 60 |
| — | 5.0 | 5.7 | 5.7 | 15.6 | 3.4 | 0.528 | 60 |
| — | 10.0 | 11.3 | 12.0 | 30.8 | 5.1 | 0.424 | 60 |
| 11.00 | 17.5 | 19.8 | 20.5 | 8.7 | 6.0 | 0.295 | 60 |
| 11.00 | 17.5 | 19.8 | 20.5 | 12.3 | 6.4 | 0.311 | 60 |
| 11.00 | 17.5 | 19.8 | 20.5 | 12.3 | 6.4 | 0.311 | 60 |
| — | 21.0 | 23.7 | 24.4 | 4.2 | 6.3 | 0.257 | 60 |

TABLE 2

| DEPTH APPLIED TO WATER (ft) | VACUUM APPLIED TO CASING (in Hg) | DIFF. PRES. (in $H_2O$) | APPLIED HEAD (ft $H_2O$) | TOTAL HEAD (ft $H_2O$) | TIME (min.) | CYCLES | FLOW RATE (gpm) | YIELD (gpm/ft) | AIR PRES. (psig) |
|---|---|---|---|---|---|---|---|---|---|
| 16.75 | 0.0 | 0.0 | 0.0 | 1.0 | n/a pump off | n/a pump off | n/a pump off | n/a pump off | n/a pump off |
| 8.00 | 9.5 | 11 | 10.7 | 11.7 | n/a pump off | n/a pump off | n/a pump off | n/a pump off | n/a pump off |
| — | 9.5 | 0 | 10.7 | 11.7 | 10.0 | 2 | 5.2 | 0.446 | 60 |
| 16.50 | 10.0 | 0 | 11.3 | 12.3 | 5.0 | 1 | 5.2 | 0.426 | 60 |
| 18.05 | 10.0 | 52 | 11.3 | 12.3 | 9.4 | 2 | 5.6 | 0.452 | 60 |
| 18.60 | 9.0 | 55 | 10.2 | 11.1 | 10.0 | 2 | 5.2 | 0.469 | 60 |
| 18.60 | 10.0 | 80 | 11.3 | 12.3 | 22.8 | 5 | 5.7 | 0.466 | 60 |

The foregoing description of certain embodiments of the present invention has been provided for purposes of illustration only, and it is understood that numerous modifications or alterations may be made without departing from the spirit and scope of the invention as defined in the following claims.

What is claimed is:

1. A well structure for removing fluids from a subterranean formation having an aquifer contaminated by the presence of organic compounds in fluids therein, said aquifer including a water table spaced below the ground surface, said well structure comprising:
   a well casing extending downwardly from the ground surface to a location below the water table, said well casing including perforations permeable to liquids present in the formation and positioned so that liquids from the water table may enter said casing through the perforations to establish a liquid level within the casing;
   a pneumatic pump located in the well casing having a pump chamber and an inlet for introducing fluids into the chamber from within the casing;
   first conduit means in flow communication with the pump chamber and a vacuum source for evacuating air from the pump chamber to induce a flow of liquid from the well casing into the pump chamber;
   second conduit means in flow communication with a head space in the casing above the liquid level and a vacuum source for applying a vacuum to the head space;
   third conduit means in flow communication with the pump chamber and a source of pressurized air for delivering pressurized air into the pump chamber;
   fourth conduit means in flow communication with the pump chamber for conducting liquid from the pump chamber in response to pressurized air delivered into the chamber through said third conduit means; and
   control means for selectively connecting said first and third conduit means in flow communication with the pump chamber.

2. A method for removing fluids from a subterranean formation having an aquifer contaminated by the presence of organic compounds in fluids therein, said aquifer including a water table spaced below the ground surface, said method comprising the steps of:
   (a) providing a well, comprising:
      a well casing extending downwardly from the ground surface to a location below the water table, said well casing including perforations permeable to liquids present in the formation and being positioned so that liquids from the water table may enter said casing through the perforations to establish a liquid level within the casing;
      a pump located in the well casing having a pump chamber and an inlet for introducing fluids into the pump chamber from within the well casing;
      first conduit means in flow communication with the pump chamber and a vacuum source for evacuating air from the pump chamber;
      second conduit means in flow communication with a head space in the well casing above the liquid level and the vacuum source for applying a vacuum to the head space; and
      third conduit means in flow communication with the pump chamber and a source of pressurized air for delivering pressurized air into the pump chamber;
   (b) applying a vacuum to the pump chamber through the first conduit means to induce a flow of formation fluids from within the casing into the pump chamber while simultaneously preventing the flow of pressurized air into the pump chamber from the third conduit means;
   (c) applying a flow of pressurized air to the pump chamber from the third conduit means to displace fluids from the pump chamber while simultaneously preventing application of a vacuum to the pump chamber from the first conduit means and;
   (d) applying a vacuum to the head space through the second conduit means to induce a flow of formation fluids into the well casing through the perforations.

3. A well for removing fluids from a subterranean formation having an aquifer contaminated by the presence of organic compounds in fluids therein, said aquifer including a water table spaced below the ground surface, said well comprising:

- a well casing extending downwardly from the ground surface to a location below the water table, said well casing including perforations permeable to liquids present in the formation and positioned so that liquids from the water table may enter said casing through the perforations to establish a liquid level within the casing;
- a pump having a pump chamber, said pump chamber being positioned within the well casing to receive liquid into the chamber from within the casing;
- a pump intake defined on said pump and in flow communication between the well casing and the pump chamber for introducing formation fluids into the pump chamber;
- vacuum means in flow communication with the pump chamber for supplying a vacuum thereto for inducing a flow of formation fluids from within the casing into the pump chamber at a rate sufficient to provide a drawdown of the water table within the casing from the initial level to a second level adjacent the intake port to enable collection of organic compounds present as a floating layer on the water table into the intake port;
- a supply of compressed fluid connected in flow communication with the pump chamber for inducing a flow of pressurized fluid into the pump chamber to displace fluids from the pump chamber;
- outlet means in flow communication with the pump chamber for receiving a flow of fluids displaced from the pump chamber by compressed fluid;
- conduit means in flow communication with the outlet means for conducting a flow of fluids from the outlet means to an above-ground location for treatment thereof; and
- first control means for selectively applying one of either vacuum or compressed fluid flow communication with the pump chamber while simultaneously blocking the other.

4. The well of claim 3, further comprising seal means positioned adjacent the top of the well casing for sealing the annular area from the atmosphere.

5. The well of claim 4, comprising means for applying a vacuum to the annular area below the seal.

6. A method for removing fluids from a subterranean formation having an aquifer contaminated by the presence of organic compounds in fluids therein, said aquifer including a water table spaced below the ground surface, said method comprising the steps of:

(a) providing a well, comprising:
- a well casing extending downwardly from the ground surface to a location below the water table, said well casing including perforations permeable to liquids present in the formation and being positioned so that liquids from the water table may enter said casing through the perforations to establish a level within the casing and define a head space above the liquid level;
- a pump located in the well casing having a pump chamber, said pump chamber being positioned within the well casing such that at least a portion of the pump chamber is below the liquid level within the casing, with the upper end of the pump chamber closest to the liquid level,
- a pump intake defined on said pump and in flow communication with the well casing and the pump chamber for introducing formation fluids into the pump chamber, said intake port being positioned at a location in the casing vertically spaced below an initial level of the water table,
- vacuum means in flow communication with the pump chamber for applying a negative pressure to the pump chamber,
- compressed fluid supply in flow communication with the pump chamber for inducing a flow of pressurized fluid into the pump chamber,
- outlet means in flow communication with the pump chamber for receiving the flow of pressurized fluids and the formation fluids displaced thereby, and
- conduit means in flow communication with the outlet means for conducting fluids from the pump chamber to an above-ground location for treatment thereof, (b) applying a vacuum to the pump chamber to induce a flow of formation fluids from within the casing into the pump chamber at a rate sufficient to provide a drawdown of the water table within the casing from the initial level to a second level which is closely adjacent the intake port to introduce a flow of fluids from the formation into the pump chamber and enable collection of organic compounds present as a floating layer on the water table while simultaneously preventing the flow of compressed fluid into the pump chamber;

(c) applying a flow of pressurized air from the compressed fluid supply to the pump chamber to displace fluids from the pump chamber while simultaneously preventing flow communication between the pump chamber and the vacuum means; and (d) applying a vacuum to the head space to induce a flow of formation fluid into the well casing through the perforations.

7. The method of claim 6, wherein the well further includes seal means positioned adjacent the top of the well casing for sealing the annular area from the atmosphere.

8. The method of claim 7, wherein said well further includes means for applying a vacuum to the annular area below the seal and means for controlling the vacuum applied to the annular area and the pump chamber.

9. A well structure for removing fluids from a subterranean formation having an aquifer contaminated by the presence of organic compounds in fluids therein, said aquifer including a water table spaced below the ground surface, said well structure comprising:

- a well casing extending downwardly from the ground surface to a location below the water table, said well casing including perforations permeable to liquids present in the formation and positioned so that liquids from the water table may enter said casing through the perforations to establish a liquid level within the casing;
- a pump having a pump chamber positioned within the well casing;
- a pump intake port defined on said pump and in flow communication with the well casing and the pump chamber for introducing formation fluids into the pump chamber;
- vacuum means in flow communication with the pump chamber for supplying a vacuum thereto for inducing a flow of formation fluids from within the casing into the pump chamber;
- compressed fluid supply in flow communication with the pump chamber for inducing a flow of pressurized fluid into the pump chamber to displace fluids introduced into the pump chamber from the formation;

outlet means in flow communication with the pump chamber for receiving the flow of pressurized fluids and the formation fluids displaced thereby;

conduit means in flow communication with the outlet means for conducting fluids from the pump chamber to a treatment location for treatment thereof;

seal means positioned adjacent the top of the well casing for sealing the annular area from the atmosphere; and conduit means in flow communication with the vacuum source and a head space in the casing above the liquid level for applying a vacuum to the head space below the seal; and first control means for selectively connecting one of either the vacuum means or compressed fluid supply in flow communication with the pump chamber.

10. A well structure for removing fluids from a subterranean formation having an aquifer contaminated by the presence of organic compounds in fluids therein, said aquifer including a water table spaced below the ground surface, said well structure comprising:

a well casing extending downwardly from the ground surface to a location below the water table, said well casing including perforations permeable to liquids present in the formation and positioned so that liquids from the water table may enter said casing through the perforations to establish a liquid level within the casing;

a pneumatic pump located in the well casing having a pump chamber and an inlet for introducing fluids into the chamber from within the casing;

first conduit means in flow communication with the pump chamber and a vacuum source for evacuating air from the pump chamber to induce a flow of liquid from the well casing into the pump chamber;

second conduit means in flow communication with a head space in the casing above the liquid level and a vacuum source for applying a vacuum to the head space;

third conduit means in flow communication with the pump chamber and a source of pressurized air for delivering pressurized air into the pump chamber; and control means for controlling the differential pressure between the pump chamber and the head space.

11. The well of claim 10, wherein said control means comprises a valve operatively associated with the second conduit.

12. A method for removing fluids from a subterranean formation having an aquifer contaminated by the presence of organic compounds in fluids therein, said aquifer including a water table spaced below the ground surface, said method comprising the steps of:

(a) providing a well, comprising:

a well casing extending downwardly from the ground surface to a location below the water table, said well casing including perforations permeable to liquids present in the formation and being positioned so that liquids from the water table may enter said casing through the perforations to establish a liquid level within the casing;

a pump located in the well casing having a pump chamber and an inlet for introducing fluids into the chamber from within the well casing;

first conduit means in flow communication with the pump chamber and a vacuum source for evacuating air from the pump chamber;

second conduit means in flow communication with a head space in the well casing above the liquid level and the vacuum source for applying a vacuum to the head space;

third conduit means in flow communication with the pump chamber and a source of pressurized air for delivering pressurized air into the pump chamber; and control means for controlling the differential pressure between the pump chamber and the head space;

(b) applying a vacuum to the pump chamber through the first conduit means to induce a flow of formation fluids from within the casing into the pump chamber; and (c) applying a flow of pressurized air to the pump chamber from the third conduit means to displace fluids from the pump chamber.

13. A method for removing fluids from a subterranean formation having an aquifer contaminated by the presence of organic compounds in fluids therein, said aquifer including a water table spaced below the ground surface, said method comprising the steps of:

(a) providing a well, comprising:

a well casing extending downwardly from the ground surface to a location below the water table, said well casing including perforations permeable to liquids present in the formation and being positioned so that liquids from the water table may enter said casing through the perforations to establish a liquid level within the casing;

a pump located in the well casing having a pump chamber and an inlet for introducing fluids into the pump chamber from within the well casing;

first conduit means in flow communication with the pump chamber and a vacuum source for evacuating air from the pump chamber;

second conduit means in flow communication with a head space in the well casing above the liquid level and the vacuum source for applying a vacuum to the head space; and third conduit means in flow communication with the pump chamber and a source of pressurized air for delivering pressurized air into the pump chamber (b) applying a vacuum to the pump chamber through the first conduit means to induce a flow of formation fluids from within the casing into the pump chamber;

(c) applying a flow of pressurized air to the pump chamber from the third conduit means to displace fluids from the pump chamber; and (d) controlling the differential pressure between the pump chamber and the head space.

14. A well for removing fluids from a subterranean formation having an aquifer contaminated by the presence of organic compounds in fluids therein, said aquifer including a water table spaced below the ground surface, said well comprising:

a well casing extending downwardly from the ground surface to a location below the water table, said well casing including perforations permeable to liquids present in the formation and positioned so that liquids from the water table may enter said casing through the perforations to establish a liquid level within the casing;

a pump having a pump chamber, said pump chamber being positioned within the well casing to receive liquid into the chamber from within the casing;

a pump intake defined on said pump and in flow communication between the well casing and the pump chamber for introducing formation fluids into the pump chamber;

vacuum means in flow communication with the pump chamber for supplying a vacuum thereto for inducing a flow of formation fluids from within the casing into the pump chamber at a rate sufficient to provide a drawdown of the water table within the casing from the initial level to a second level adjacent the intake port to enable collection of organic compounds present as a floating layer on the water table into the intake port;

a supply of compressed fluid connected in flow communication with the pump chamber for inducing a flow of pressurized fluid into the pump chamber to displace fluids from the pump chamber;

outlet means in flow communication with the pump chamber for receiving a flow of fluids displaced from the pump chamber by compressed fluid;

conduit means in flow communication with the outlet means for conducting a flow of fluids from the outlet means to an above-ground location for treatment thereof;

seal means positioned adjacent the top of the well casing for sealing a head space within the casing above the liquid level from the atmosphere;

means for applying a vacuum to the head space below the seal; and means for controlling the differential pressure between the pump chamber and the head space to maintain the water table within the casing at a desired location adjacent the pump intake during steady state operation to position the floating layer of organic contaminants closely adjacent the pump intake so that organic constituents may be readily drawn into the pump chamber.

15. A method for removing fluids from a subterranean formation having an aquifer contaminated by the presence of organic compounds in fluids therein, said aquifer including a water table spaced below the ground surface, said method comprising the steps of:

(a) providing a well, comprising:

a well casing extending downwardly from the ground surface to a location below the water table, said well casing including perforations permeable to liquids present in the formation and being positioned so that liquids from the water table may enter said casing through the perforations to establish a liquid level within the casing and define a head space above the liquid level;

a pump located with the well casing having a pump chamber, said pump chamber being positioned within the well casing such that at least a portion of the pump chamber is below the liquid level within the casing, with the upper end of the pump chamber closest to the liquid level, a pump intake defined on said pump and in flow communication with the well casing and the pump chamber for introducing formation fluids into the pump chamber, said intake port being positioned at a location in the casing vertically spaced below an initial level of the water table, vacuum means in flow communication with the pump chamber for applying a negative pressure to the pump chamber, compressed fluid supply in flow communication with the pump chamber for inducing a flow of pressurized fluid into the pump chamber, outlet means in flow communication with the pump chamber for receiving the flow of pressurized fluids and the formation fluids displaced thereby, conduit means in flow communication with the outlet means for conducting fluids from the pump chamber to an above-ground location for treatment thereof, seal means positioned adjacent the top of the well casing for sealing the head space from the atmosphere, and means for applying a vacuum to the head space below the seal and means for controlling the vacuum applied to the head space and the pump chamber;

(b) applying a vacuum to the pump chamber to induce a flow of formation fluids from within the casing into the pump chamber at a rate sufficient to provide a drawdown of the water table within the casing from the initial level to a second level which is closely adjacent the intake port to introduce a flow of fluids from the formation into the pump chamber and enable collection of organic compounds present as a floating layer on the water table; and (c) applying a flow of pressurized air to the pump chamber to displace fluids from the pump chamber; and (d) controlling the differential pressure between the pump chamber and the head space to maintain the water table within the casing at a desired location adjacent the pump intake during steady state operation to position the floating layer of organic contaminants closely adjacent the pump intake so that organic constituents may be readily drawn into the pump chamber.

* * * * *

UNITED STATES PATENT AND TRADEMARK OFFICE
CERTIFICATE OF CORRECTION

Patent No : 6,146,104

Dated : November 14, 2000

Inventor(s) : John J. Mastroianni
Darren M. DeFabo

It is certified that error appears in the above-identified patent and that said Letters Patent are hereby corrected as shown below:

Column 6, line 59, after "pump chamber" insert --44--.

Column 11, line 59, after "establish a" insert --liquid--.

Column 4, line 19, after "with" delete "to".

Column 5, line 21, after "long" insert --as--.

Column 8, line 64, after "water in the" delete "was" and insert --well--.

Signed and Sealed this

Twenty-ninth Day of May, 2001

*Attest:*

NICHOLAS P. GODICI

*Attesting Officer*     Acting Director of the United States Patent and Trademark Office